G. W. THOMPSON.
ACETYLENE GAS GENERATOR.
APPLICATION FILED DEC. 8, 1917.
1,272,726.
Patented July 16, 1918.
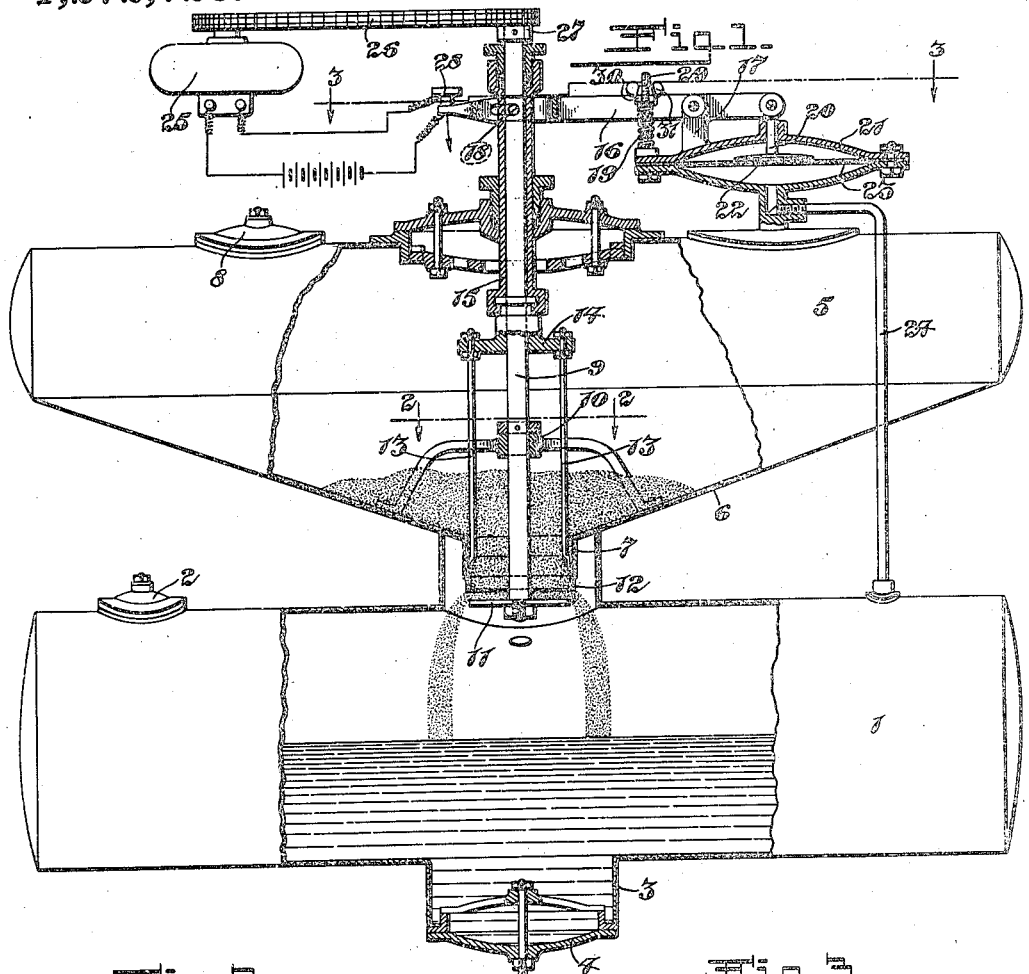
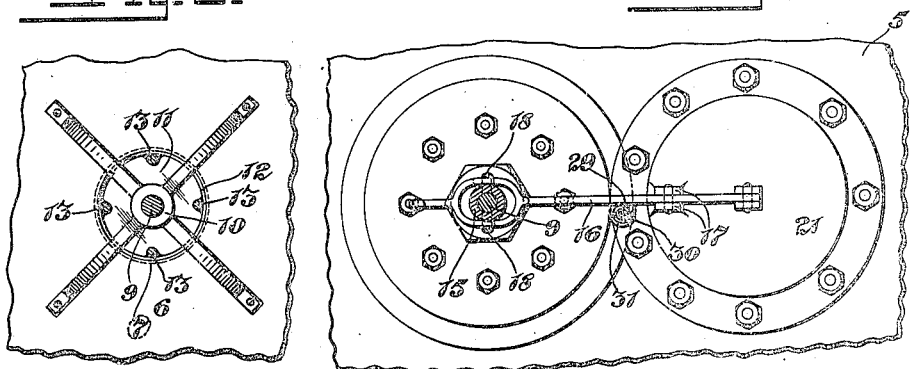
Attest.
Charles A. Becker.
Inventor.
George W. Thompson,
by Rippey & Kingsland,
His Attorneys.

UNITED STATES PATENT OFFICE.

GEORGE W. THOMPSON, OF SPRINGFIELD, MISSOURI, ASSIGNOR OF THIRTY-TWO ONE-HUNDRED-AND-TWENTY-EIGHTHS TO WILLIAM B. SANFORD, TWENTY-FOUR ONE-HUNDRED-AND-TWENTY-EIGHTHS TO DOUGLAS J. LANDERS, TWENTY-ONE ONE-HUNDRED-AND-TWENTY-EIGHTHS TO WILLIAM A. McATEE, TWELVE ONE-HUNDRED-AND-TWENTY-EIGHTHS TO ALPHONSO B. LOVAN, TWELVE ONE-HUNDRED-AND-TWENTY-EIGHTHS TO GEORGE W. YOUNG, AND THREE ONE-HUNDRED-AND-TWENTY-EIGHTHS TO WILLIAM T. SHORES, ALL OF SPRINGFIELD, MISSOURI, AND SIX ONE-HUNDRED-AND-TWENTY-EIGHTHS TO CLARENCE H. NICHOLS, OF NEW YORK, N. Y.

ACETYLENE-GAS GENERATOR.

1,272,726.  Specification of Letters Patent.  Patented July 16, 1918.

Application filed December 8, 1917. Serial No. 206,166.

*To all whom it may concern:*

Be it known that I, GEORGE W. THOMPSON, a citizen of the United States, residing at Springfield, Greene county, Missouri, have invented a new and useful Acetylene-Gas Generator, of which the following is a specification.

This invention relates to acetylene gas generators.

An object of the invention is to provide an acetylene gas generator comprising two receptacles, each of which is arranged to contain a gas forming material which when brought together generate the gas, in combination with a passage through which the gas forming material may pass from one of said receptacles into the other, and mechanism for controlling said passage to deliver measured quantities of the gas forming material from one of said receptacles to the other to generate gas when the gas generated in the second receptacle becomes depleted or reduced to or below a desired minimum.

Another object of the invention is to provide an apparatus for generating gas comprising a generating tank arranged to contain one of the gas forming materials and a receptacle arranged to contain another gas forming material, in combination with a device for controlling the delivery of the gas forming material from the receptacle into the generating tank, and means for controlling the operation of said device in conformity with the variation of the quantity and pressure of the gas generated in the generating tank.

With the foregoing and other objects in view, I have illustrated my invention in the accompanying drawings, in which—

Figure 1 is a view illustrating in section the mechanism for delivering the gas forming material from the receptacle into the generating tank.

Fig. 2 is a sectional view on the line 2—2 of Fig. 1.

Fig. 3 is a sectional view on the line 3—3 of Fig. 1.

The generating tank 1 is arranged to contain one of the gas forming materials, such as water, and is provided with an opening through which the material may be delivered into the tank, said opening being normally closed by a removable plug or closure 2. The bottom of the tank 1 is provided with a depending portion 3 having a removable closure 4 which may be detached in order to permit cleaning of the tank 1 and the removal therefrom of any deposits or settlings.

The receptacle 5 is supported above the tank 1 and is arranged to contain the other gas forming material, such as carbid. The receptacle 5 is provided with a hopper-shaped bottom 6 having a depending open passage 7 extending into the tank 1. The inclined walls of the bottom cause the carbid to move toward the passage 7 from which the carbid may be delivered into the generating tank. The receptacle 5 is provided with an opening having a removable closure 8 through which the material may be placed into the receptacle.

A vertical shaft 9 is supported by an appropriate frame 10, or otherwise as desired and has a plate 11 secured to the lower end thereof for supporting the carbid. A shell 12 is mounted in the passage 7 and is movable toward and away from the plate 11. Thus when the shell 12 is in contact with the plate 11 the passage is closed and none of the carbid can pass from the receptacle into the generating tank; and when the shell 12 is raised, as illustrated in Fig. 1, the carbid may pass between the shell and the plate 11 and drop into the liquid gas forming material in the generating tank. This device and the means for operating it constitute the subject-matter of the present invention.

As illustrated the shell 12 is supported by a series of rods 13 having their upper ends connected to a supporting member 14 which is supported by a sleeve 15 encircling the shaft 9 and extending through a frame secured to the upper wall of the receptacle 5. The shaft 9 is revoluble within the sleeve 15.

A lever 16 is pivoted to a support 17 and is connected by pin-in-slot connection 18 with the sleeve 15 so that by operation of the lever 16 the sleeve 15 may be raised and lowered as required to move the shell 12 to and from closed position. Normally the lever 16 is supported in raised position by a spring 19 so that the shell 12 is normally above the plate 11. The lever 16 is provided with a link 20 extending into a diaphragm case 21 and having a plate 22 in connection therewith bearing upon a diaphragm 23 within the case 21. A pipe 24 constitutes a passage for conducting gas from the tank 1 into the case 21 below the diaphragm 23 so that when the quantity and pressure of the gas within the tank 1 rises to the desired point the diaphragm 23 will be affected thus raising the link 20 and operating the lever 16 causing said lever to actuate the shell 12 to closed position in contact with the plate 11. When the quantity and pressure of the gas in the generating tank becomes reduced the shell 12 is moved to open position automatically by the spring 19 acting against the lever 16. In this way the passage for delivering the carbid from the receptacle 5 into the generating tank is automatically opened and closed in harmony with the variation in the quantity and pressure of the gas in the generating tank.

In order to assure discharge of the carbid from the plate 11 movement of said plate is desirable. In the embodiment illustrated the movement of the plate 11 is a rotary movement imparted by the operation of an electric motor 25 driving a chain 26 engaging a sprocket wheel 27, secured to the upper portion of the shaft 9. Thus when the motor 25 is operating the shaft 9 is constantly rotated. Provision is made for stopping rotation of the shaft 9 concurrently with the movement of the shell 12 to closed position unless it is not desired that the plate 11 rotate when the passage from the receptacle 5 to the generating tank is closed. One of the wires in the circuit for operating the motor is connected with a contact member 28 and the other wire of the circuit is connected to the end of the lever 16. When the lever 16 is in its raised position in which it supports the shell 12 in open position, said lever is in contact with the contact member 28 and the circuit is closed, thus causing the motor to operate and rotate the shaft 9. When the lever 16 is operated as required to move the shell 12 to closed position the lever 16 is moved out of contact with the contact member 28 thus opening the circuit through which the motor 25 is energized. As a result of this operation the motor stops and the shaft 9 also stops rotating so that the plate 11 is no longer turned. This occurs just prior to the time that the shell 12 contacts with the plate 11, so that there is no interference by the parts with each other.

On some occasions it may be desired to hold the shell 12 permanently in closed position to prevent delivery of the carbid into the generating tank and the consequent generation of gas. Various expedients may be employed for this purpose and, in the embodiment shown, the spring 19 encircles a rod 29 which extends through an arm 30 on the lever 16. The upper end of the rod 29 is threaded and is equipped with a manipulative nut 31 by operation of which the lever 16 may be lowered out of contact with the contact member 28 to retain the shell 12 in engagement with the plate 11. When the nut 31 is set in the adjustment mentioned it will permanently retain the shell 12 in closed position until the nut is released or adjusted in position to permit the spring 19 to raise the lever 16 and open the passage into the generating tank.

I am aware that the construction and arrangement of the parts may be modified in various particulars without departing from the principle and scope of the invention. Therefore, I do not restrict myself to unessential details of construction and arrangement, but what I claim and desire to secure by Letters Patent is:—

1. An acetylene gas generator, comprising a generating tank arranged to contain a gas forming material, a receptacle arranged to contain another gas forming material, a passage for conducting the gas forming material from the receptacle into the tank, a movable element controlling the passage of the gas forming material into the tank, a device movable to positions to open and to close said passage, means for moving said device to positions to open and to close said passage, and mechanism controlled by said means whereby said element will be maintained in motion when said device is in open position and will be maintained stationary when said device is in closed position.

2. An acetylene gas generator, comprising a generating tank arranged to contain a gas forming material, a receptacle arranged to contain another gas forming material, a passage for conducting the gas forming material from the receptacle into the tank, an element for controlling the delivery of the gas forming material through said passage into the tank, a device for closing said passage, a lever connected with said device, an actuator for moving said lever in one direction to move said device to open position to permit the gas forming material to pass from the receptacle into the tank, an element operable by the pressure of the gas for moving said lever in the opposite direction to move said device to position to close said passage, and actuating mechanism controlled by said lever whereby said first-named element will be maintained in motion when said device is in open position and will be maintained stationary when said device is in closed position.

3. An acetylene gas generator, comprising a generating tank arranged to contain a gas forming material, a receptacle arranged to contain another gas forming material, a passage for conducting the gas forming material from the receptacle into the tank, an element controlling the passage of the gas forming material from said passage into the tank, a device for opening and closing said passage, a lever connected with said device, an actuator for moving said lever in one direction to move said device to open position, means operated by the pressure of the gas generated in the generating tank for moving said lever in the opposite direction to move said device to closed position, actuating mechanism for moving said element, and means for controlling said actuating mechanism by said lever whereby said element will be maintained in motion when said device is in open position and will be maintained stationary when said device is in closed position.

4. An acetylene gas generator, comprising a generating tank arranged to contain a gas forming material, a receptacle arranged to contain another gas forming material, a passage for conducting the gas forming material from the receptacle into the tank, a movable element adjacent to the open end of said passage in the tank, a device movable into and out of contact with said element to close and to open said passage, means for moving said device out of contact with said element to open said passage and to permit the gas forming material to pass into the generating tank, means controlled by the pressure of the gas in the generating tank for moving said device into contact with said element to close said passage, and actuating mechanism controlled by said means whereby said element will be maintained in motion when said device is out of contact with said element and will be maintained stationary when said device is in contact with said element.

5. An acetylene gas generator, comprising a generating tank arranged to contain a gas forming material, a receptacle arranged to contain another gas forming material, a passage for conducting the gas forming material from the receptacle into the tank, a device for opening and closing said passage, an element controlling the discharge of gas forming material from said passage into the tank, a lever for moving said device to open and to closed position, and actuating mechanism controlled by said lever whereby said element will be maintained in motion when said device is in open position and will be maintained stationary when said device is in closed position.

6. An acetylene gas generator, comprising a generating tank arranged to contain a gas forming material, a receptacle arranged to contain another gas forming material which when brought into contact with the gas forming material in the tank will cause the generation of gas, a passage for conducting gas forming material from said receptacle into the generating tank, a support for supporting the gas forming material in said passage, a device movable to positions to open and to close said passage, means for moving said device to open and to closed positions, and actuating mechanism controlled by said means whereby said support will be maintained in motion when said device is in open position, and will be maintained stationary when said device is in closed position.

GEORGE W. THOMPSON.